United States Patent
Mireles et al.

(10) Patent No.: US 11,902,708 B2
(45) Date of Patent: Feb. 13, 2024

(54) METHOD FOR GENERATING A SYNTHETIC SKIN MODEL

(71) Applicant: Present Communications, Inc., Redwood City, CA (US)

(72) Inventors: Matt Mireles, Redwood City, CA (US); Yousif Astarabadi, Redwood City, CA (US); Shaun Astarabadi, Redwood City, CA (US); Emil Romanus, Redwood City, CA (US); Torsten Reil, Redwood City, CA (US)

(73) Assignee: Present Communications, Inc., Redwood City, CA (US)

( * ) Notice: Subject to any disclaimer, the term of this patent is extended or adjusted under 35 U.S.C. 154(b) by 38 days.

(21) Appl. No.: 17/853,802

(22) Filed: Jun. 29, 2022

(65) Prior Publication Data
US 2022/0408058 A1    Dec. 22, 2022

Related U.S. Application Data

(63) Continuation-in-part of application No. 17/533,534, filed on Nov. 23, 2021, which is a continuation of application No. 17/192,828, filed on Mar. 4, 2021, now Pat. No. 11,218,668, which is a continuation-in-part of application No. 16/870,010, filed on May 8, 2020, now Pat. No. 10,958,874.

(60) Provisional application No. 63/216,442, filed on Jun. 29, 2021, provisional application No. 62/845,781, filed on May 9, 2019.

(51) Int. Cl.
*H04N 7/15* (2006.01)
*G06T 11/20* (2006.01)

(52) U.S. Cl.
CPC ............... *H04N 7/15* (2013.01); *G06T 11/20* (2013.01)

(58) Field of Classification Search
None
See application file for complete search history.

(56) References Cited

U.S. PATENT DOCUMENTS

| | | | |
|---|---|---|---|
| 2016/0314619 A1* | 10/2016 | Luo | G06T 7/344 |
| 2019/0014884 A1* | 1/2019 | Fu | G06V 40/168 |
| 2019/0222807 A1* | 7/2019 | Rivard | G10L 21/10 |

* cited by examiner

Primary Examiner — Daniel T Tekle
(74) Attorney, Agent, or Firm — Run8 Patent Group, LLC; Peter Miller

(57) ABSTRACT

A method for generating a synthetic skin model includes: accessing an image of a user; generating a facial landmark container including facial landmarks extracted from the region of the image depicting a face of a user; initializing a set of test skin models, each populated with a set of model coefficients selected from a first set of possible model coefficient values and defining parameters for constructing a synthetic face unique within the first set of test skin models; injecting the set of test skin models and the facial landmark container into a synthetic face generator to generate a set of synthetic skin images, each representing a synthetic face, unique within the set of synthetic skin images, according to facial landmarks extracted from the region of the image; and rendering the set of synthetic skin images within a user interface.

1 Claim, 4 Drawing Sheets

METHOD FOR GENERATING A SYNTHETIC SKIN MODEL

CROSS-REFERENCE TO RELATED APPLICATIONS

This Application claims the benefit of U.S. Provisional Application No. 63/216,442, filed on 29 Jun. 2021, which is incorporated in its entirety by this reference.

This Application is a continuation-in-part of U.S. patent application Ser. No. 17/533,534, filed on 22 Nov. 2021, which is a continuation application of U.S. patent application Ser. No. 17/192,828, filed on 4 Mar. 2021, which is a continuation-in-part of U.S. patent application Ser. No. 16/870,010, filed on 8 May 2020, which claims the benefit of U.S. Provisional Application No. 62/845,781, filed on 9 May 2019, each of which is incorporated in its entirety by this reference.

TECHNICAL FIELD

This invention relates generally to the field of video conferencing and more specifically to a new and useful method generating a synthetic skin model in the field of video conferencing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
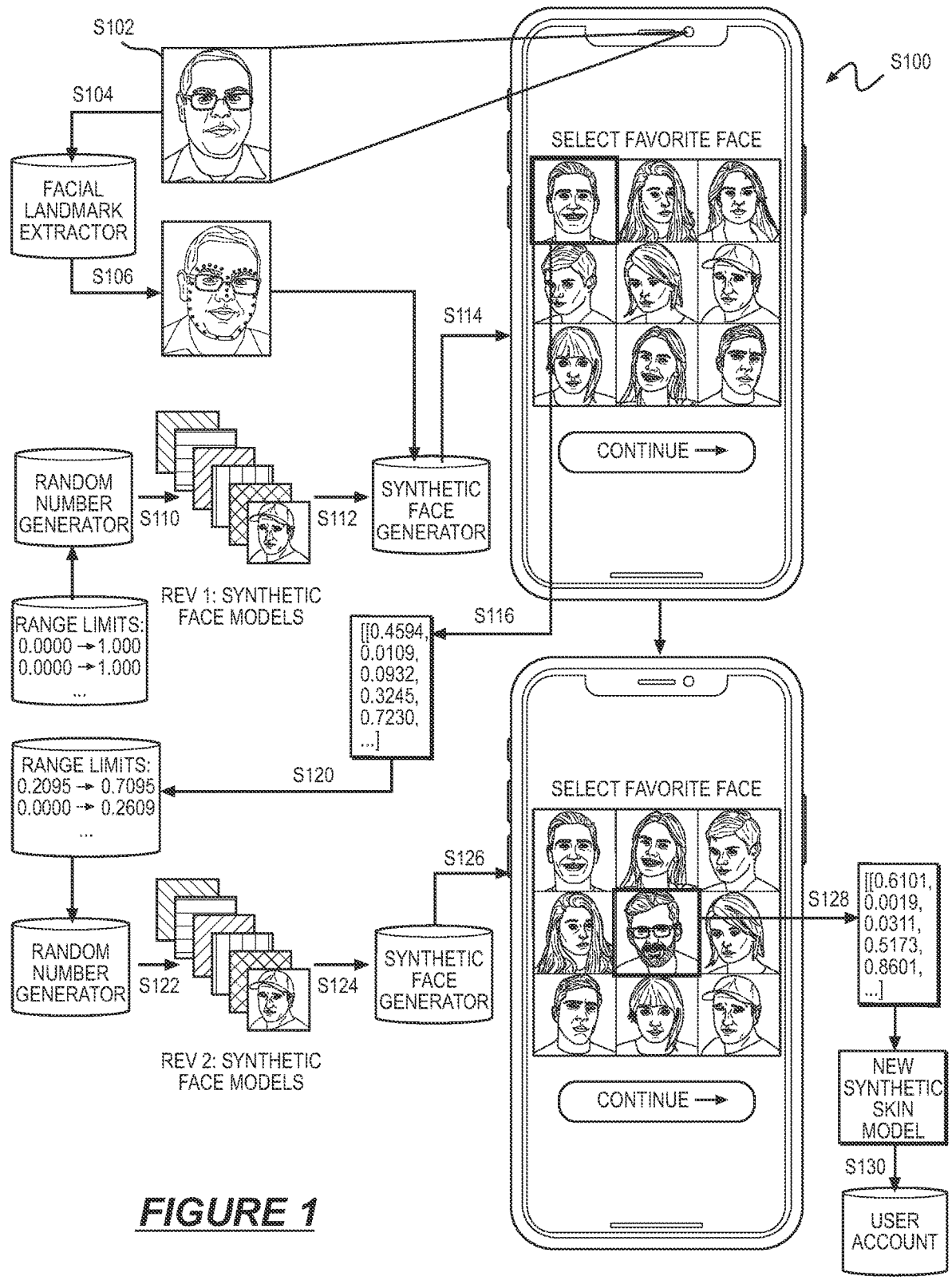
FIG. 1 is a flowchart representation of a method.

As shown in FIG. 1, a method S100 for generating a synthetic skin model includes: accessing an image of a user in Block S102; detecting a face of the user in a region of the image in Block S104; and generating a facial landmark container comprising facial landmarks extracted from the region of the image in Block S106.

The method S100 also incudes: initializing a first set of test skin models in Block S110, each test skin model in the first set of test skin models populated with a set of model coefficients a) selected from a first set of possible model coefficient values and b) defining parameters for constructing a synthetic face unique within the first set of test skin models; injecting the first set of test skin models and the facial landmark container into a synthetic face generator to generate a first set of synthetic skin images in Block S112, each synthetic skin image in the first set of synthetic skin images representing a synthetic face, unique within the first set of synthetic skin images, according to facial landmarks extracted from the region of the image; rendering the first set of synthetic skin images within a user interface in Block S114; and receiving selection of a first preferred synthetic skin image from the first set of synthetic skin images in Block S116.

The method S100 further includes: narrowing the first set of possible model coefficient values around model coefficients contained in a first test skin model associated with the first preferred synthetic skin image to define a second set of possible model coefficient values in Block S120; initializing a second set of test skin models in Block S122, each test skin model in the second set of test skin models populated with a set of model coefficients a) selected from the narrowed set of possible model coefficient values and b) defining parameters for constructing a synthetic face unique within the second set of test skin models; injecting the second set of test skin models and the facial landmark container into the synthetic face generator to generate a second set of synthetic skin images in Block S124; rendering the second set of synthetic skin images within a user interface in Block S126; receiving selection of a second preferred synthetic skin image from the first set of synthetic skin images in Block S128; and storing a second test skin model associated with the second preferred synthetic skin image as a skin model in a user account associated with the user in Block S130.

2. Applications

Generally, Blocks of the method S100 can be executed by a native or browser-based application executing on a computing device (e.g., a smartphone, tablet, laptop computer) and/or a remote computer system in order to generate a unique skin model: that represents a possible but non-existent (or "synthetic") human face based on a sequence of preferences supplied by a user; and that can be combined with facial metadata (e.g., facial edges, emotions, and/or facial landmarks) extracted from an authentic image of the user to generate synthetic face images that depicted the user's physiognomy and pose—as represented in this authentic image—according to the possible but non-existent human face.

In particular, the device can: generate a first set of test skin models containing unique combinations of model coefficients selected from full model coefficient ranges that represent vast ranges human facial characteristics; generate a first set of synthetic skin images based on these first test skin models and facial metadata (hereinafter a facial landmark container containing a set of facial landmarks) derived from an image of the user; present these first synthetic skin images to the user for review; and receive selection of a first preferred synthetic skin image from this first set from the user. The device can then: narrow the model coefficient ranges around the model coefficient contained in a first test skin model associated with the first preferred synthetic skin image; generate a second set of test skin models containing unique combinations of model coefficients selected from these narrowed model coefficient ranges; generate a second set of synthetic skin images based on these second test skin models and the facial landmark container; present these second synthetic skin images to the user for review; and receive selection of a second preferred synthetic skin image from this second set from the user. The device can then repeat this process over multiple subsequent "refinement cycles" (e.g., for a total of three or five refinement cycles) to isolate a singular test skin model that produces synthetic skin images that fulfill or approximates the user's preferences for how she appears to other users during a video call or in static images or videos posted to an online social network. Accordingly, the device can store this test skin model as a new skin model in the user's account or profile.

Later, the user may select this skin model to define her appearance to another user during a video call. For example, during a video call between the user at the device and a second user at a second device, the device and/or the remote computer system can: transmit the skin model to the second device or otherwise enable the second device to access the skin model; access a live video feed of the user; implement a facial landmark extractor (or other facial metadata extractor) to compress the video feed into a lightweight (e.g., sub-kilobyte) feed of facial landmark containers (or a feed facial metadata containers); and stream these facial landmark containers to the second device. Upon receipt of each subsequent facial landmark container from the device, the second device can: inject this facial landmark container and the skin model into a synthetic face generator to generate a synthetic skin image depicting the user according to the skin model and with a pose and expression represented in the facial landmark container; and then render this synthetic skin image for the second user in near real-time (e.g., with a latency less than 500 milliseconds). The second device can repeat this process for each subsequent facial landmark container received from the device during the video call in order to reconstruct and render a live video feed of the user depicted according to the skin model.

The device can similarly reconstruct and render a live video feed of the second user depicted according to a second face model, look model, or skin model—selected by the second user—according to facial landmark containers received from the second device.

2.1 Bandwidth

Therefore, rather than transmit and receive data-rich video feeds during a video call, a first device executing Blocks of the method S100 can instead extract facial landmark constellations from a first video feed captured at the first device, package these facial landmark constellations into facial landmark containers, and transmit a first feed of facial landmark containers to the second device. The second device can then: leverage a local copy of the synthetic face generator and a local copy of a first skin model associated with the first user to transform the first feed of facial landmark containers into a photorealistic representation of the first user's face; and render this first photorealistic synthetic video feed in near real-time. Concurrently, the second device—also executing Blocks of the method S100—can extract facial landmark containers from a second video feed captured at the second device and transmit a second feed of facial landmark containers to the second device. The first device can then: leverage a local copy of the synthetic face generator and a local copy of a second skin model associated with the second user to transform the second feed of facial landmark containers into a photorealistic representation of the second user's face; and render this second photorealistic synthetic video feed in near real-time. The second user may thus experience the video call as though a color video was received from the first user's device—and vice versa—without necessitating a consistent, high-bandwidth, low-latency data connection between the first and second devices.

More specifically, by extracting facial landmark containers from a high(er)-definition video feed according to the method S100, the first device can compress this high(er)-definition video feed by multiple orders of magnitude (e.g., by approximately 100 times). Transmission of a feed of facial landmark containers—at a natural frame rate of the original high(er)-definition video (e.g., 24 frames per second)—from the first device to the second device during a video call may therefore require significantly less bandwidth than the original high-definition video (e.g., less than 10 kilobits per second rather than 1.5 Megabits per second). The second device can: then reconstruct the first video feed of the first user by passing a local copy of a (pseudo)-unique skin model of the first user and a first feed of facial landmark containers—received from the first device—into a synthetic face generator, which rapidly outputs a stream of synthetic, photorealistic images of the first user's face (e.g., in under 100 milliseconds or within as little as 30 milliseconds of a receipt of each subsequent facial landmark container from the first device); and render this stream of synthetic, photorealistic images of the first user's face. Therefore, the first and second devices can execute Blocks of the method S100 to support consistent, high-quality video—with significantly less upload and download bandwidth—during a video call.

2.2 Latency

Furthermore, humans may perceive audible and visual events temporally offset by up to 200 milliseconds as occurring concurrently. However, the first and second devices can cooperate to rapidly execute Blocks of the method S100. For example, the first device can: capture a video frame; generate first facial landmark container representing a first facial landmark constellation detected in this video frame; and upload this first facial landmark container to a computer network within 50 milliseconds. The second device can then: download this facial landmark container; inject this facial landmark container and a stored local copy of a first skin model of the first user into a local copy of the synthetic face generator to generate a synthetic face image; overlay the synthetic face image on a static or animated background frame to generate a synthetic video frame; and render the synthetic video frame on a display of the second device within 150 milliseconds of receipt of the facial landmark container.

Generally, because the first device compresses a video feed (e.g., by orders of magnitude) into a stream of facial landmark containers (e.g., in the form of a vector containing 68 (x,y) coordinates for 68 predefined facial landmarks), packet size for facial landmark containers transmitted from the first device to the second device may be relatively very small. Therefore, throughput requirements to transmit this stream of facial landmark containers between the first and second devices over wireless and local area networks may be significantly less than actual throughputs supported by these networks. More specifically, transmission of this lightweight stream of facial landmark containers from the first device to the second device may represent a relatively small portion of the total duration of time from capture of a video frame at the first device to reconstruction and rendering of a corresponding synthetic video frame at the second device. Accordingly, this stream of facial landmark containers may not (or may very rarely) approach throughput limitations of these networks, thereby enabling these networks to transmit this lightweight stream of facial landmark containers from the first device to the second device with low latency, low packet loss, and high consistency despite changes in traffic between other devices connected to these networks and even during periods of high traffic on these networks.

2.3 Realism

By executing Blocks of the method S100, the first and second devices can render authentic, photorealistic representations of the second and first users, respectively, during a video call—such as relative to cartoons, avatars, or caricatures that may loose authenticity and integrity due to compression and simplification of user facial expressions.

For example, the first device and/or a remote computer system (e.g., a remote server, a computer network) can: access an image (e.g., a digital photographic image, a frame from a video clip) of the first user; detect the first user's face in this image; implement a standard or generic facial landmark extractor to detect and extract a facial landmark constellation; from this image; represent this facial landmark constellation in a facial landmark container; initialize a first look model containing an initial set of coefficients (or "weights"); pass this facial landmark container and the initial look model into a synthetic face generator to generate an initial synthetic face image; characterize a difference between this initial synthetic face image and the first user's face depicted in the image; and iteratively adjust coefficients in the first look model such that insertion of this first look model and the facial landmark container into the synthetic face generator produces synthetic face images with smaller differences from the first user's face depicted in the image. Once a difference between a synthetic face image thus produced according to the first look model and the first user's face depicted in the image falls below a threshold difference, the first device or the remote computer system can store this first look model in association with the first user, such as in an account or profile associated with the user.

In this example, the first device and/or the remote computer system can implement this process when the first user creates an account within a first instance of the native or browser-based video conferencing application executing on the first device, during a setup period just before starting a video call with the second device, or after starting a video call with the second device. Additionally or alternatively, the first device (or the remote computer system) can repeat this process for additional images or video clips of the first user (e.g., depicting the first user with various facial expressions and from various perspectives) and fuse look models thus calculated for these additional images or video clips into a single, more robust look model of the user.

The first device (or the remote computer system) can then share this look model—specific to the first user—with a second device before or during a video call. During this video call, the first device can also capture a video frame via an integrated or connected camera, extract a facial landmark container from this video frame, and stream this facial landmark container to the second device. The second device can then implement this look model to transform this facial landmark container into a synthetic, photorealistic image of the first user's face, which exhibits a facial expression of the first user, a mouth shape of the first user, and a position of the first user relative to the camera at a time that the camera captured the video frame.

Therefore, though the first device streams a feed of facial landmark containers to the second device rather than a live video feed of photographic video frames, the second device can leverage the look model of the first user and the synthetic face image to generate a photorealistic feed of synthetic images that both: appear to the second user as the first user; and authentically reproduce the first user's facial expression, mouth shape, and a position relative to the first device.

The first device can also execute Blocks of the method S100 to generate and refine a skin model defining a similar structure. The device and/or a second device can then generate realistic synthetic face images based on this skin model and facial landmarks extracted from an image or video feed of the first user.

2.4 Spoofing

Furthermore, a device can execute Blocks of the method S100 to abstract controls for modifying facial characteristics represented by a skin model and instead refine a skin model for a user by: defining a set of test skin models containing wide ranges of model coefficients; generating a set of synthetic skin images according to these test skin models; record the user's preferences within these synthetic skin images; narrow the ranges of model coefficients according to the user's synthetic skin image preferences; and repeat this process over multiple refinement cycles. More specifically, the device can: refine (i.e., narrow) a set of possible coefficient values based on the user's preferences within a set of synthetic skin images generated according to a set of test skin models that span a wider range of coefficient values; and repeat this process over a sequence of refinement cycles to further refine the set of possible coefficient values around a narrow combination of model coefficient ranges that represent the user's skin model preferences.

Accordingly, the device may prevent the user from directly "designing" or "tuning" a skin model to appear as another known human. More specifically, the device can execute Blocks of the method S100: to enable a human to develop a skin model that represents a possible but non-existent human face; but to prevent the user from spoofing or deep-faking another particular human by tuning a skin model to generate synthetic skin images that closely approximate this particular human.

3. Facial Landmark Extractor

Generally, a device and/or the remote computer system executing Blocks of the method S100 can implement a facial landmark extractor: to detect a face in a region of an image (e.g., a photographic image, a frame in a video clip, and/or a frame in a live video feed); to scan this region of the image for features analogous to predefined facial landmark types; and to represent locations, orientations, and/or sizes, etc. of these analogous features—detected in the region of the image—in one facial landmark container. In particular, like the facial deconstruction model described above, the device and/or the remote computer system can implement the facial landmark extractor: to detect spatial characteristics of a face—such as including positions of eye corners, a nose tip, nostril corners, mouth corners, end points of eyebrow arcs, ear lobes, and/or a chin—depicted in a 2D image; and to represent these spatial characteristics in a single container (e.g., a vector, a matrix), as shown in FIG. 1-4. For example, the device and/or the remote computer system can implement facial landmark detection to extract a facial landmark container: from a video frame during generation of a face model for a user (e.g., during initial setup of the user's account); from a photographic image during generation of a "look model" or "skin model" for the user; and/or from a video frame for transmission to a second device during a video call.

In one implementation shown in FIGS. 1-4, to generate a facial landmark container from an image (or frame), the device (or the remote computer system): accesses the image; implements facial detection techniques to detect a face in a region of the image; and initializes a facial landmark container in the form of a vector of length equal to a total quantity of predefined facial landmark types (e.g., 68). Then, for a first facial landmark type in this predefined set of facial landmark types, the device: scans the region of the frame for a feature analogous to the first facial landmark type; extracts a first location (and/or a first size, first orientation) of a particular feature depicted in the image in response to identifying this particular feature as analogous to (e.g., of a similar form, relative location, relative size) the first facial landmark type according to the facial landmark extractor; and then writes this first location (and/or first size, first orientation) of the particular feature to a first position in the vector corresponding to the first facial landmark type. Similarly, for a second facial landmark type in this predefined set of facial landmark types, the device: scans the region of the frame for a feature analogous to the second facial landmark type; and then writes a null value to a second position in the vector corresponding to the second facial landmark type in response to failing to identify a particular feature analogous to the second facial landmark time in the region of the image. The device then repeats this process for each other facial landmark type in the predefined set in order to complete the facial landmark container for this image.

Furthermore, in this example, the device (or the remote computer system) can generate a facial landmark container that represents a pixel position (e.g., an (x,y) coordinate) of each detected facial landmark type within the image—and not specifically the position of the facial landmark within the region of the image depicting the user's face—such that insertion of this facial landmark container and a face model of the user into a synthetic face generator: produces a synthetic face image that appears as a photographic analog of the user's face depicted in the image; and locates this synthetic face image in a position within a synthetic video frame that is analogous to the location of the user's face depicted in the image.

3.1 Other Features

In one variation, the facial landmark extractor detects and extracts other facial features from a region of an image depicting a face, such as in addition to or instead of facial landmarks. For example, the facial landmark extractor can: detect edges of the face, chin, lips, eyes, nose, and brow depicted in an image; define each of these edges as a sequence of keypoints within a 2D or 3D coordinate system; and store these keypoints in a facial landmark container for this image.

The method S100 is described here is executed by a device and/or a remote computer system to detect and compile facial landmarks into facial landmark containers. However, the device and/or a remote computer system can additionally or alternatively detect and compile other such facial features into facial landmark containers.

4. Synthetic Face Generator

Similarly, the device and/or the remote computer system can implement a synthetic face generator to transform a facial landmark container—representing a facial expression of a user detected in an image or frame—and a face model of the user into a synthetic face image, which defines a photorealistic representation of the user's face with this same facial expression. In particular, like the facial reconstruction model described above, the device and/or the remote computer system can inject a facial landmark container—derived from an original image or frame of a user—and a face model of the user into the synthetic face generator to generate a synthetic face image that may be perceived as (at least) a superficially authentic photorealistic representation of the user's face with the same facial expression depicted in the original image or frame. For example, the device and/or the remote computer system can implement the synthetic face generator to generate a synthetic face image: to generate and validate a new face model for a user (e.g., during initial setup of the user's account); to generate and validate a new look model for the user; and/or to generate synthetic face images of another user during a video call.

Figure 2:
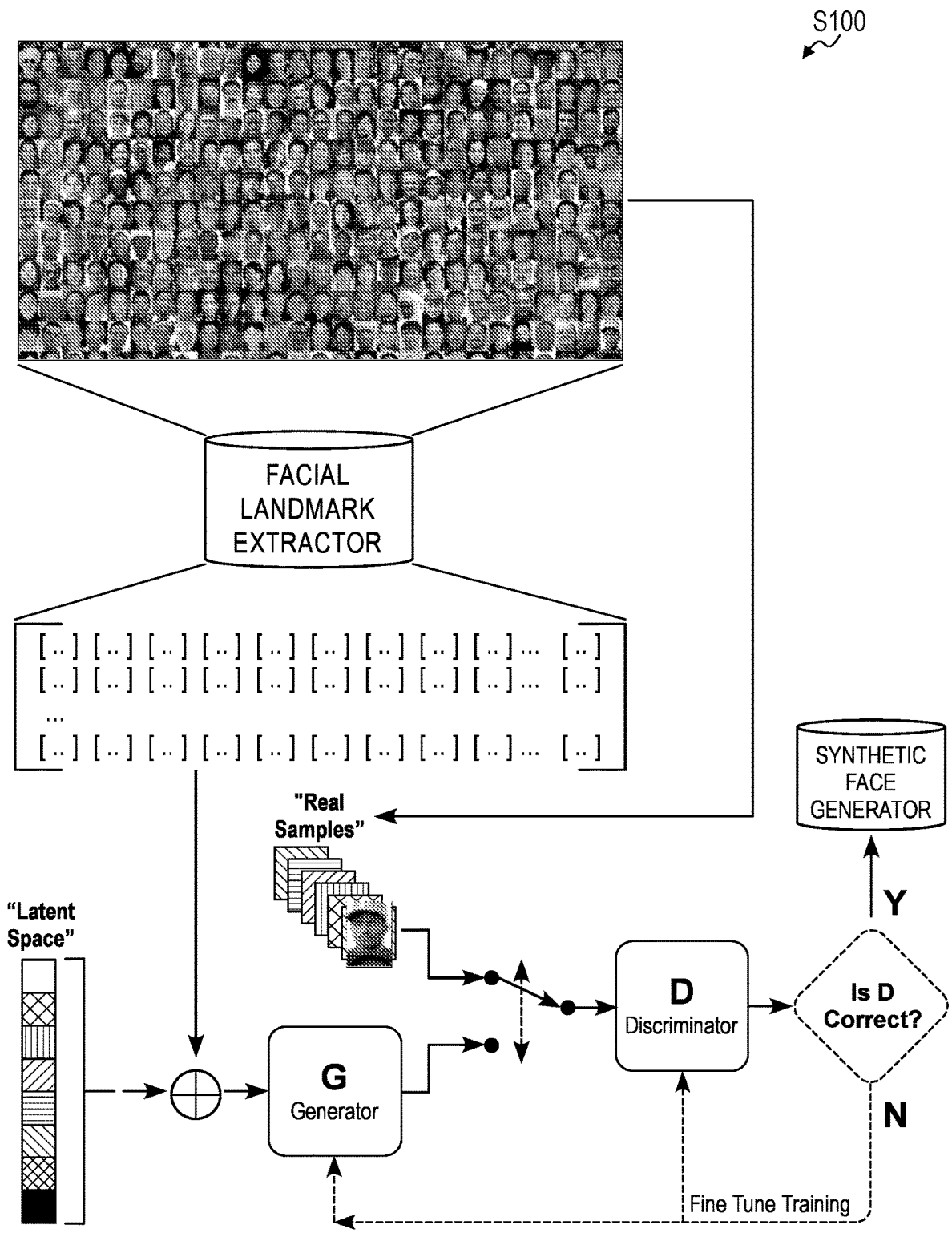
FIG. 2 is a flowchart representation of one variation of the method.

In one implementation shown in FIG. 2, the remote computer system: accesses a population of images of human faces (e.g., thousands, millions or 2D color images of human faces); implements the facial landmark extractor to extract a facial landmark container for each image in the population; and trains a conditional generative adversarial network to generate an image—given a facial landmark container and a face model containing a set of coefficients or "weights"— with statistics analogous to the population of images.

In particular, the remote computer system can train the conditional generative adversarial network to output a synthetic face image based on a set of input conditions, including: a facial landmark container, which captures relative locations (and/or sizes, orientations) of facial landmarks that represent a facial expression; and a face model, which contains a (pseudo-) unique set of coefficients characterizing a unique human face and secondary physiognomic features (e.g., face shape, skin tone, facial hair, makeup, freckles, wrinkles, eye color, hair color, hair style, and/or jewelry). Therefore, the remote computer system can input values from a facial landmark container and coefficients from a face model into the conditional generative adversarial network to generate a synthetic face image that depicts a face— (uniquely) represented by coefficients in the face model— exhibiting a facial expression represented by the facial landmark container.

The remote computer system can then store this conditional generative adversarial network as a synthetic face generator and distribute copies of this synthetic face generator to devices executing Blocks of the method S100, as shown in FIG. 2.

5. Face Model Generation

Furthermore, the device can leverage the facial landmark extractor and the synthetic face generator to generate a face model for a user associated with the device, such as: based on a video clip captured by the device during a user account setup period; based on a video clip captured by the device just before (e.g., seconds, minutes before) initiating a video call with another device; or based on an image (e.g., a "target image") uploaded or selected by the user before or during a video call with another device.

5.1 Single-Image Face Model Calculation

In one implementation, the device (or the remote computer system): detects a target face in a target image; represents a target constellation of facial landmarks, detected in the target image, in a target facial landmark container; initializes a target set of face model coefficients; generates a synthetic test image based on the target facial landmark container, the target set of face model coefficients, and the synthetic face generator; characterizes a difference between the synthetic test image and the target face detected in the target image; tunes the target set of face model coefficients to reduce the difference; and then generates a face model based on the target set of face model coefficients.

More specifically, in this implementation, the device (or the remote computer system): accesses a target image of the user; detects a face in a target region of the target image; and implements the facial landmark extractor to generate a target facial landmark container. The device then: defines a target set of face model coefficients (or "weights," "conditions"); implements the synthetic face generator to transform the target facial landmark container and the target set of face model coefficients into a target synthetic face image; and characterizes a first difference between the target synthetic face image and the target region of the target image depicting the face. The device further: adjusts the target set of face model coefficients to reduce the first difference; implements the synthetic face generator to transform the target facial landmark container and the revised set of face model coefficients into a revised synthetic face image; characterizes a revised difference between the target synthetic face image and the revised region of the target image depicting the face; and repeats this process until this difference becomes asymptotic, approaches a null value, or falls below a threshold difference. Finally, the device generates a face model of the user based on the final set of face model coefficients thus calculated for the target image.

In this implementation, the user may upload or link to an existing image of herself, such as a digital copy of a headshot photograph or a profile image from a social networking website. Alternatively, the device can capture a photographic image of the user, such as during a user account setup period or just before (e.g., seconds, minutes before) a video call is started at the device. The device can then process this image locally to generate a face model for the user or upload this image to the remote computer system for remote face model generation.

In particular, the device (or the remote computer system) can: detect a face in a region of the image; extract or store this region of the image depicting the user's face as an "authentic face image"; implement the facial landmark extractor to extract a set of facial landmarks from the region of the image; and store these facial landmarks in a facial landmark container. The device can then initialize a new face model for the user containing a set of baseline coefficients. For example, the device can: initialize set of baseline coefficients that represent an "average" face (e.g., [0.500, 0.500, 0.500, . . . , 0.500, 0.500]); or pseudorandomly calculate baseline values for each coefficient in the new face model (e.g., [0.534, 0.023, 0.487, . . . , 0.324, 0.768]). The device injects baseline coefficients within the face model and the facial landmark container into the synthetic face generator, which outputs a "baseline" synthetic face image and characterizes a baseline difference between the authentic face image and the baseline synthetic face image.

In one example, the device: compresses or upsamples the synthetic face image to match a resolution of the authentic face image; subtracts the baseline synthetic face image from the authentic face image in the green color space to calculate a deviation image in the green color space; calculates a green-space deviation value based on a combination (e.g., a sum) of absolute values contained in pixels in the green-space deviation image; repeats this process for the blue and red color spaces to calculate red- and blue-space deviation values; and quantifies a total difference between the authentic face image and the baseline synthetic face image based on a combination (e.g., a sum, an average) of the red-, green-, and blue-space deviation values.

In another example, the device implements a structural similarity index (or "SSIM") to quantify a baseline difference between the baseline synthetic face image and the authentic face image. In yet another example, the device: implements a facial recognition system to calculate a confidence that the face depicted in the synthetic face image is identical to the face depicted in the authentic face image; and characterizes a baseline difference between the synthetic face image and the authentic face image based on (e.g., inversely proportional to) this confidence.

Then, if the baseline difference exceeds a threshold (e.g., if a combination of red-, green-, and blue-space deviation values exceeds a threshold value; if a structural similarity index value for the baseline synthetic face image exceeds a threshold), then the device (or the remote computer system) can repeat the foregoing process to refine and validate coefficients in the face model.

For example, the device can implement reverse propagation techniques to adjust (or "perturb") a first coefficient in the face model in a first direction and repeat the foregoing process to generate a revised synthetic face image based on this revised face model and the facial landmark container. Then, if a revised difference between the authentic face image and this revised synthetic face image is less than the baseline difference, the device can further perturb the first coefficient in the face model in the first direction. Conversely, if this revised difference between the authentic face image and the regenerated synthetic face image is greater than the baseline difference, the device can perturb the first coefficient in the face model in the opposite direction.

The device can repeat the foregoing process to refine the first coefficient in the face model, generate a new synthetic face image according to this revised face model, and verify that this new synthetic face image represents a better approximation of (i.e., exhibits less deviation from) the authentic face image than a synthetic face image generated according to a previous revision of the face model. The device can thus converge on a value for the first coefficient that minimizes a difference between: the authentic face image; and a synthetic face image generated by the synthetic face generator given the facial landmark container.

The device can repeat this process for each other coefficient in the face model in order to converge on a set of coefficients that minimize a difference between: the authentic face image; and a synthetic face image generated by the synthetic face generator given the facial landmark container. The device can also: store this set of coefficients in an initial face model; and then again repeat the foregoing process to further refine (or "tune") these coefficients, starting with this set of coefficients in the initial face model rather than baseline (e.g., average or pseudorandomly-generated) coefficients described above.

(In one variation, the device can implement the foregoing methods and techniques to tune multiple coefficients in the face model concurrently rather than tune coefficients in the face model individually.)

Once a difference between the authentic face image and a synthetic face image generated according to this set of coefficients becomes asymptotic, approaches a null value, or falls below a threshold difference, etc., the device (or the remote computer system) can store this set of coefficients in a face model and associate this face model with the user.

The device can therefore iteratively refine a set of coefficients in order to generate a face model that—when injected into the synthetic face generator with the facial landmark container—produces a synthetic face image that approximates the authentic face image, such as to a degree that a human may recognize the user in the synthetic face image and/or such that a human may discern no or limited visual differences between the authentic face image and the synthetic face image. More specifically, the device can execute the foregoing process to tune coefficients within a face model for the user such that insertion of this face model and the facial landmark container—extracted from the authentic face image—into the synthetic face generator produces a realistic approximation of the facial expression, face shape, skin tone, facial hair, makeup, freckles, wrinkles, eye color, hair color, hair style, and/or jewelry, etc. depicted in the authentic face image. Furthermore, insertion of this face model and a different facial landmark container—such as extracted from a video frame captured by the device during a later video call—into the synthetic face generator produces a realistic approximation of: the face shape, skin tone, facial hair, makeup, freckles, wrinkles, eye color, hair color, hair style, and/or jewelry, etc. depicted in the authentic face image; and the facial expression depicted in the video frame.

5.2 Face Model Calculation with Multiple Images

Figure 3:
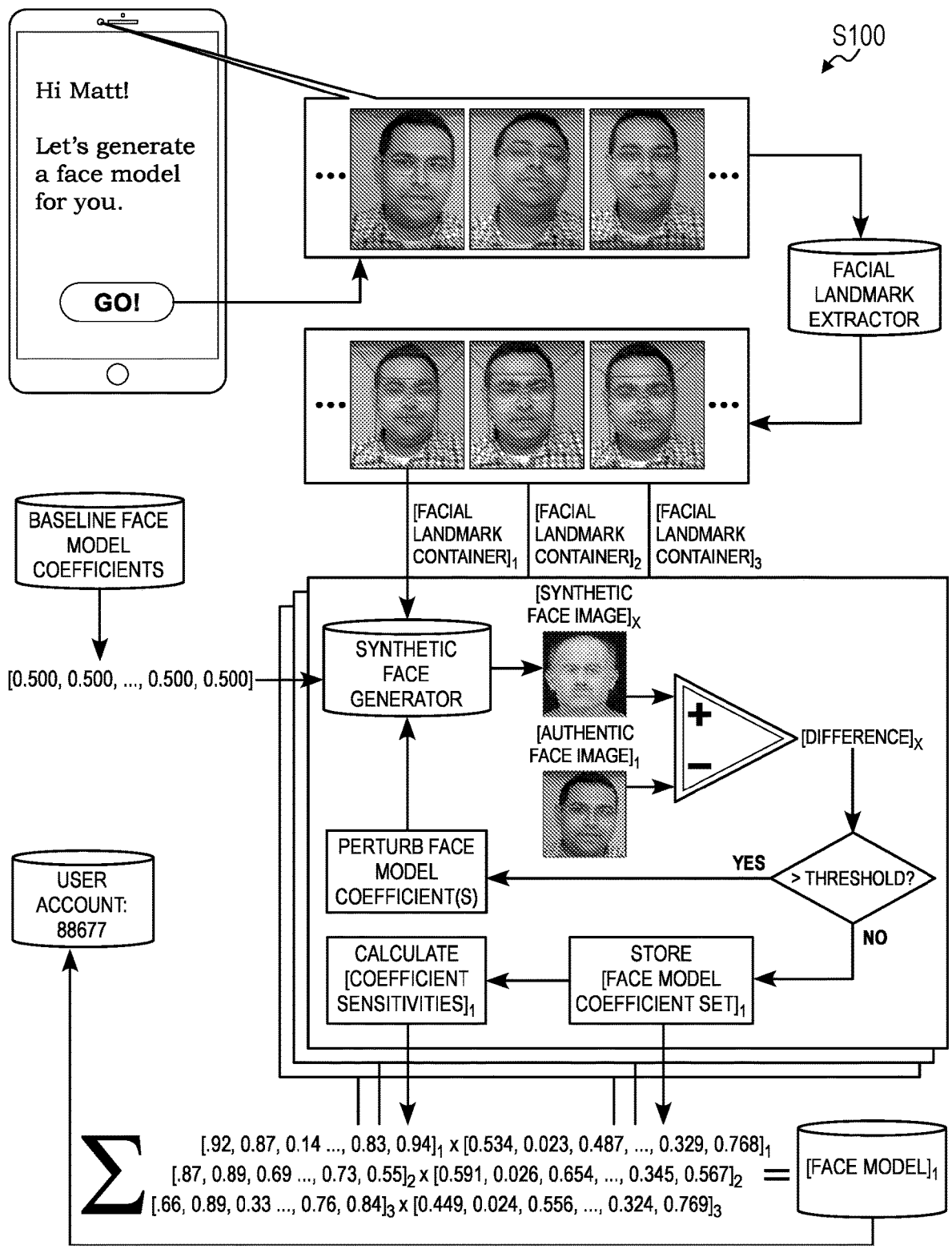
FIG. 3 is a flowchart representation of one variation of the method.

In a similar implementation shown in FIG. 3, the device (or the remote computer system) accesses a video clip of the user (e.g., captured by the device during a user account setup period, during a video call setup period preceding a video call with another user). For each frame in a (sub)set of frames in the video clip, the device implements methods and techniques described above to: detect the user's face in a region of the frame; characterize positions of a set of features—analogous to facial landmark types in the predefined set of facial landmark types—in the region of the frame; represent positions of the set of features in a facial landmark container; initialize a set of face model coefficients; insert the facial landmark container and the set of face model coefficients into the synthetic face generator to generate a synthetic face image; characterize a difference between the synthetic face image and the region of the frame depicting the face; and iteratively adjust the set of face model coefficients to reduce a difference between the region of the frame and a synthetic face image generated according to these face model coefficients. The device then calculates a combination of these sets of face model coefficients associated with this (sub)set of frames and stores this combination as a face model for the user.

In this implementation, the user may upload an existing video clip of herself, such as a video clip between five seconds and one minute in duration and/or containing between ten and 1,000 frames. Alternatively, the device can capture a video clip of the user, such as when a video call function is selected by the user and before a video call is initiated at the device. The device can then process this video clip locally to generate a face model for the user or upload this video clip to the remote computer system for remote face model generation.

5.2.1 Frame Selection

In particular, the device (or the remote computer system) can extract a set of frames from the video clip and then execute the foregoing methods and techniques to converge on a set of coefficients for each frame in this set. For example, the device can: implement methods and techniques described above to detect the user's face in each frame in the video clip; implement the facial landmark extractor to generate a facial landmark container for each frame in the video clip; and select a subset of frames (e.g., ten frames, 32 frames, 64 frames)—from the video clip—that correspond to facial landmark containers exhibiting least similarity and/or greatest ranges of facial landmark values within this set of facial landmark containers. More specifically, the device can compare facial landmark containers extracted from frames in the video clip to identify a subset of frames that represent a greatest range of face poses and facial expressions within the video clip.

5.2.2 First Frame

The device can then: select a first frame—from this subset of frames—associated with a first facial landmark container; extract a first authentic face image from a region of the first frame depicting the user's face; initialize a set of baseline coefficients, as described above; and execute the processes described above to perturb these baseline coefficients and to converge on a first set of coefficients that—when combined with the first facial landmark container—produces a synthetic face image exhibiting a minimum difference from the first authentic face image.

5.2.3 Sensitivity

The device can also characterize a sensitivity of each coefficient—in this first set of coefficients—to accurate reproduction of the first authentic face image.

For example, once the device converges on a final value of a first coefficient in this first set of coefficients, the device can: pass the first set of coefficients—including the final value of the first coefficient—and the first facial landmark container into the synthetic face generator to generate a first synthetic face image; quantify a first difference between the first synthetic face image and the first authentic face image; perturb the final value of the first coefficient—in the first set of coefficients—by a perturbation unit (e.g., "0.005"); pass this perturbed set of coefficients—including the perturbed value of the first coefficient—and the first facial landmark container into the synthetic face generator to generate a perturbed synthetic face image; quantify a perturbed difference between the perturbed synthetic face image and the first authentic face image; and calculate a sensitivity of the first coefficient for the first frame proportional to a magnitude of difference between the first difference and the perturbed difference.

More specially, if perturbation of the final value of the first coefficient by the perturbation unit produces a small deviation from maximum (or "best") correspondence between a synthetic face image and the first authentic face image, the device can calculate a low sensitivity of the first coefficient for the first frame. However, if perturbation of the final value of the first coefficient by the perturbation unit produces a large deviation from maximum (or "best") correspondence between a synthetic face image and the first authentic face image, the device can calculate a high sensitivity of the first coefficient for the first frame.

The device can repeat this process for each other coefficient in the first set of coefficients to characterize sensitivity of accurate reproduction of the first authentic face image to each coefficient in this first set of coefficients.

5.2.4 Additional Frames

The device can repeat the foregoing process for each other frame in the (sub)set of frames, including: calculating a set of coefficients that minimize a difference between an authentic face image extracted from a frame and a synthetic face image generated according to the set of coefficients and a facial landmark container extracted from the frame image; and characterizing sensitivity of accurate reproduction of the authentic face image to each coefficient in the set of coefficients for each frame in the (sub)set of frames.

More specifically, the device can repeat the foregoing process for each other frame in the (sub)set of frames in order to generate a population of coefficient sets, wherein each set of coefficients in the population is tuned for one corresponding frame in the (sub)set of frames and wherein each coefficient in each set of coefficients in the population is associated with a sensitivity.

5.2.5 Face Model Composition

The device can then combine corresponding coefficients across this population of coefficient sets to calculate a face model for the user.

For example, the device can: calculate a first linear combination of first coefficients—across this population of coefficient sets—weighted by their corresponding sensitivities; store this first linear combination as a first composite coefficient; calculate a second linear combination of second coefficients—across this population of coefficient sets— weighted by their corresponding sensitivities; store this second linear combination as a second composite coefficient; and repeat this process for each other coefficient in this population of coefficient sets. The device then aggregates these composite coefficients into a face model for the user Therefore, the device can execute the foregoing process to tune coefficients within sets of coefficients for individual frames depicting the user and then fuse these sets of coefficients into one face model for the user. Insertion of this face model and a first facial landmark container—extracted from a first frame in this set—into the synthetic face generator produces a first realistic approximation of the facial expression, face shape, skin tone, facial hair, makeup, freckles, wrinkles, eye color, hair color, hair style, and/or jewelry, etc. depicted in the first frame. Similarly, insertion of this face model and a second facial landmark container—extracted from a second frame in this set—into the synthetic face generator produces a second realistic approximation of the facial expression, face shape, skin tone, facial hair, makeup, freckles, wrinkles, eye color, hair color, hair style, and/or jewelry, etc. depicted in the second frame.

Furthermore, insertion of this face model and a different facial landmark container—such as extracted from a video frame captured by the device during a later video call—into the synthetic face generator produces a realistic approximation of: the face shape, skin tone, facial hair, makeup, freckles, wrinkles, eye color, hair color, hair style, and/or jewelry, etc. depicted in the set of frames; and the facial expression depicted in the video frame.

5.3 Look Model

In one variation shown, the device (or the remote computer system) executes the foregoing processes: to calculate a set of face model coefficients for a "look" image uploaded or selected by the user (e.g., a digital photograph representing a physiognomy preferred by the user); to calculate a population of face model coefficient sets for frames in a video clip of the user; and to fuse these face model coefficient sets into a "look" model for the user, which yields synthetic face images that appear as the face in the "look" image when inserted into the synthetic face generator but that exhibit greater robustness to changes in face orientation and facial expression than a face model generated from a single frame or image.

In one implementation, the device (and/or the remote computer system) implement methods and techniques described above to: detect a target face in a target image; represent a target constellation of facial landmarks, detected in the target image, in a target facial landmark container; initialize a target set of face model coefficients; generate a synthetic test image based on the target facial landmark container, the target set of face model coefficients, and the synthetic face generator; characterize a difference between the synthetic test image and the target face detected in the target image; and tune the target set of face model coefficients to reduce the difference. In this implementation, the device (and/or the remote computer system) also accesses a video clip—separate from the target image—of the user. For each frame in a set of (e.g., all or a subset of) frames in the video clip, the device (and/or the remote computer system): detects the face of the user in a secondary region of the frame; characterizes positions of a secondary set of features, analogous to facial landmark types in the predefined set of facial landmark types, detected in the secondary region of the frame; represents positions of the secondary set of features in a secondary facial landmark container; defines a secondary set of face model coefficients; generates a secondary synthetic test image based on the secondary target facial landmark container, the secondary target set of face model coefficients, and the synthetic face generator; characterizes a secondary difference between the secondary synthetic test image and the secondary region of the frame depicting the face; and tunes the secondary set of face model coefficients to reduce the secondary difference. The device (and/or the remote computer system) then generates a face model for the user based on a combination of: the target set of face model coefficients derived from the target image; and secondary sets of face model coefficients derived from the video clip.

For example, the device can execute the process described above to: extract a target authentic face image from the look image; extract a target facial landmark container from the target authentic face image; converge on a target set of coefficients that minimize a difference between the target authentic face image and a synthetic face image generated by the synthetic face generator given the facial landmark container; and characterize sensitivity of accurate reproduction of the target authentic face image to each coefficient in the target set of coefficients.

The device can then combine this target set of coefficients with the face model—generated according to a (sub)set of frames extracted from a video clip—to generate a look model for the user. For example, the device can: retrieve a population of coefficient sets generated for the user based on the (sub)set of frames; retrieve a sensitivity for each coefficient in each coefficient set in this population; assign a target weight (e.g., 0.900) to each coefficient in the target set of coefficients generated according to the look image; and assign a secondary weight—less than the target weight (e.g., 0.100)—to each coefficient set in the population of coefficient sets. For a first coefficient, the device can then: calculate a corrected weight of the first coefficient in the target set of coefficients based on a combination (e.g., a product) of the target weight and a sensitivity of the first coefficient in the target set of coefficients; calculate corrected weights of the first coefficient across the population of coefficient sets based on combinations (e.g., products) of the secondary weight and sensitivities of the first coefficient across the population of coefficient sets; calculate a first linear combination of first coefficients—across the target coefficient set and the population of coefficient sets—according to their corresponding corrected weights; and store this first linear combination as a first composite coefficient in the look model. Similarly, for a second coefficient, the device can: calculate a corrected weight of the second coefficient in the target set of coefficients based on a combination of the target weight and a sensitivity of the second coefficient in the target set of coefficients; calculate corrected weights of the second coefficient across the population of coefficient sets based on combinations of the secondary weight and sensitivities of the second coefficient across the population of coefficient sets; calculate a second linear combination of second coefficients—across the target coefficient set and the population of coefficient sets—according to their corresponding corrected weights; and store this second linear combination as a second composite coefficient in the look model. The device can repeat this process for each other coefficient in this target set of coefficients and the population of coefficient sets in order to complete this look model for the user.

Therefore, the device can execute the foregoing process to tune coefficients in the face model according to a look image provided by the user and to compile these tuned coefficients into a look model. Insertion of this look model and a first facial landmark container—extracted from a look image— into the synthetic face generator produces a realistic approximation of the facial expression, face shape, skin tone, facial hair, makeup, freckles, wrinkles, eye color, hair color, hair style, and/or jewelry, etc. depicted in the look image.

Furthermore, insertion of this look model and a different facial landmark container—such as extracted from a video frame captured by the device during a later video call—into the synthetic face generator produces a realistic approximation of: the face shape, skin tone, facial hair, makeup, freckles, wrinkles, eye color, hair color, hair style, and/or jewelry, etc. depicted in the look image; and the facial expression depicted in the video frame.

More specifically, in this variation, the device can leverage the face model (or a population of coefficient sets) generated for the user in order to create a "look model" based on a single look image. When the look model is injected into the synthetic face generator, the synthetic face generator can thus return a synthetic face image that approximates: the skin tone, facial hair, makeup, hair style, and/or jewelry, etc. depicted in the look image; rather than the skin tone, facial hair, makeup, hair style, and/or jewelry, etc. depicted in the set of images that yielded the face model. In particular, synthetic face images generated by the synthetic face generator according to the look model may thus resemble the user's face in the look image rather than the user's face in the set of frames.

The device can thus generate a new look model for the user based on a single look image provided by the user, such as a personal favorite candid photo of the user from an event for which a video or multiple images of the user are not available.

5.4 Multiple Looks

The device (or the remote computer system) can execute the foregoing methods and techniques to generate a face model and a set of look models for the user and to associate this face model and these look models (hereinafter "look models") with the user, such as by storing these look models in the user's account, as shown in FIGS. 1 and 3.

In one variation, the device also prompts the user to associate each look model with a particular contact or group of contacts. For example, the device can execute the foregoing process to generate: a first look model based on a first look image depicting the user as clean-shaven, clean-cut, without a hat, and wearing a tie; a second look model based on a third look image depicting the user as clean-shaven, clean-cut, without a hat, and without a tie; a third look model based on a third look image depicting the user with a beard and wearing a hat; and a fourth look model based on a fourth look image depicting the user with a beard, longer hair, and wearing facial piercings. In this example, the device can interface with the user: to associate the first look model with a first group of work-related contacts; to associate the second look model with a second group of contacts including the user's grandparents and extended family; to associate the third look model with a third group of contacts including the user's parents and siblings; and to associate the fourth look model with a fourth group of contacts including the user's closet friends, spouse, and children.

However, the device (and/or the remote computer system) can generate a set of face and look models and associate these face and look models within individual contacts or groups of contacts in any other way.

6. Avatar Creation

As shown in FIG. 1, the device (and/or the remote computer system) can also interface with the user to generate a (unique) skin model (or "avatar") that contains a unique combination of model coefficients and is configured to generate a synthetic face image representing a human-like physiognomy—different from the user—when inserted into the synthetic face generator with a facial landmark container extracted from an image of the user's face. More specifically, the device can interface with the user to generate and refine a skin model in a format similar to a face or look model but that produces synthetic face images that differ—subtly (e.g., a change in eye and skin color) or significantly (e.g., different gender and facial structure)—from the user's true physiognomy.

In one implementation, the device: pseudorandomly generates a first set of model coefficients characterizing a unique human face and secondary physiognomic features, such as described above; stores this first set of model coefficients as a first test skin model; and repeats this process to generate a first group of (e.g., four) test skin models, each containing a set of pseudorandomly-generated coefficients that characterize a unique human face and secondary physiognomic features. The delivery vehicle then: accesses an image of the user (e.g., a live video frame); detects a face in the image; extracts a facial landmark container from this face in the image; and passes each test skin model in the first group and the facial landmark container of the user into the synthetic face generator to generate a first group of synthetic face images.

The device renders the first group of synthetic face images for the user and prompts the user to select a preferred synthetic face image from the first group.

If the user selects the first synthetic face image corresponding to the first test skin model, the device then: pseudorandomly generates a second set of model coefficients that are nearer (e.g., exhibit shorter R-squared distances in n-dimensions) to the first test skin model than to other test skin models in the first group; repeats this process to generate a second group of (e.g., four) test skin models, each containing a set of pseudorandomly-generated coefficients nearer to the first test skin model than to the other test skin models in the first group; and passes each test skin model in the second group and the facial landmark container of the user into the synthetic face generator to generate a second group of synthetic face images.

The device can: render the second group of synthetic face images for the user; prompt the user to select a preferred synthetic face image from the second group; and repeat the foregoing process based on the user's selection from the second group—and subsequent groups—of synthetic face images. For example, the device can repeat this cycle for a maximum of six times or until the user otherwise confirms a particular synthetic face image generated during these cycles.

Once the user confirms a particular synthetic face image generated in this sequence, the computer system can: retrieve the test skin model corresponding to this particular synthetic face image as a new "skin" model for the user; and store this skin model in the user's account or otherwise link this skin model to the user's account.

Therefore, this new skin model may not depict a current or past physiognomy of the user but rather an authentic-looking, purely-synthetic, AI-generated representation of a human face. The user may then elect this skin model during a subsequent video call, such as to obscure the user's identity from another attendee on the video call.

6.1 First Refinement Cycle

Therefore, when the user elects a new skin model, the device can initiate a new skin generation cycle.

6.1.1 First Group of Test Skin Models

Block S110 of the method S100 recites initializing a first set of test skin models, wherein each test skin model in the first set of test skin models is populated with a set of model coefficients a) selected from a first set of possible model coefficient values and b) defining parameters for constructing a synthetic face unique within the first set of test skin models. In particular, at the start of a new skin generation cycle, the device can pseudorandomly generate a first group of (e.g., nine) test skin models, each containing a unique combination of model coefficients within the full range of possible model coefficient values.

In one implementation shown in FIG. 1, the synthetic face generator described above can be configured to output a synthetic face image based on: a facial landmark container; and a skin, face, or look model containing many (e.g., tens, hundreds) model coefficients (or "weights"), each within a nominal model coefficient range. For example, the synthetic face generator can be configured to ingest face, look, and skin models containing 100 model coefficients, each between 0.0000 and 1.0000. Therefore, in this example, the device can: initialize a first test skin model containing 100 null model coefficients; and then pseudorandomly calculate a model coefficient value within a full range of possible model coefficient values from 0.0000 and 1.0000 and write this coefficient value to a corresponding position in the test skin model for each null model coefficient. The device can repeat this process to generate additional test skin models—all unique within this first set—in Block S110, such as to generate a total quantity of nine test skin models in the first set.

6.1.2 User Facial Landmark Container

The method S100 also includes: accessing an image of a user in Block S102; detecting a face of the user in a region of the image in Block S104; and generating a facial landmark container comprising facial landmarks extracted from the region of the image in Block S106.

In one implementation, the device: captures a reference image (e.g., a static image or a frame from a video feed) of the user via a forward-facing camera integrated into (or connected to) the device in Block S102; detects a face in a region of the reference image; implements the facial landmark extractor to extract facial landmarks from this region of the reference image in Block S104; and stores these facial landmarks in a facial landmark container for synthetic skin image generation during the first refinement cycle (and/or subsequent refinement cycles) in Block S106.

6.1.3 First Preferred Synthetic Skin Image

The method S100 further includes injecting the first set of test skin models and the facial landmark container into a synthetic face generator to generate a first set of synthetic skin images in Block S112, wherein each synthetic skin image in the first set of synthetic skin images represents a synthetic face—unique within the first set of synthetic skin images—according to facial landmarks extracted from the region of the image.

In particular, the device can pass the stored facial landmark container and each test skin model—in the first group of test skin models—into the synthetic face generator to generate a first group of (e.g., nine) synthetic skin images. The device can then: render the first group of synthetic skin images in the user interface, such as in a 3×3 grid array, in Block S114; and prompt the user to select a first preferred (or "favorite") synthetic skin image from the first group.

Accordingly, the device can receive selection of a first preferred synthetic skin image from the first set of synthetic skin images in Block S116.

6.2 Second Refinement Cycle

The device can then repeat this process—with a narrowed range of model coefficient values based on model coefficients contained in a first test skin model associated with the first preferred synthetic skin image—to generate a second set of test skin models, to generate and render a second set of synthetic skin images based on these skin models, and to receive selection of a second preferred test skin model from the user.

6.2.1 Second Group of Test Skin Models

Block S120 of the method S100 recites narrowing the first set of possible model coefficient values around model coefficients contained in a first test skin model associated with the first preferred synthetic skin image to define a second set of possible model coefficient values. Block S122 of the method S100 recites initializing a second set of test skin models in Block S122, wherein each test skin model in the second set of test skin models is populated with a set of model coefficients: selected from the narrowed set of possible model coefficient values; and defining parameters for constructing a synthetic face unique within the second set of test skin models.

In particular, the device can limit a range of available values for each model coefficient—for all test skin models in the second group—based on the model coefficients in a first test skin model associated with first preferred synthetic skin image selected by the user. For example, the device can reduce the available range of each model coefficient value to 50% of its total nominal range, centered around the corresponding model coefficient value in the first test skin model. In this example, a first test skin model—associated with the first preferred synthetic skin image—can include model coefficients [0.4594, 0.0109, 0.0932, 0.3245, 0.7230, . . . ]. Accordingly, the computer system can: limit the range of first model coefficients in the second group of test skin models to between (0.2095, 0.7095); limit the range of second model coefficients in the second group of test skin models to between (0.0000, 0.2609); limit the range of third model coefficients in the second group of test skin models to between (0.0000, 0.3432); limit the range of fourth model coefficients in the second group of test skin models to between (0.0745, 0.5745); and limit the range of fifth model coefficients in the second group of test skin models to between (0.5730, 0.9730); etc.

The device can then pseudorandomly populate the second group of test skin models with model coefficients, each selected from within its corresponding narrowed second range of available coefficient values.

6.2.2 First Undesirable Synthetic Skin Image

In one variation, the device prompts the user to select a first least-favorite (or "undesirable") synthetic skin image from the first group of synthetic skin images. Generally, a greatest difference in preference between the first preferred and first undesirable synthetic skin images may correspond to the largest differences in corresponding model coefficients in the test skin models that produced these two synthetic skin images. Therefore, in this variation, rather than narrow the available range of model coefficient values—for the second group of test skin models—by a fixed magnitude around the model coefficients of the first test skin model associated with the first synthetic face image as described above, the device can instead: narrow the available range of model coefficient values by a greatest magnitude for model coefficients exhibiting the greatest difference between the test skin models that produced the first preferred and first undesirable synthetic skin images; and narrow the available range of model coefficient values by a smallest magnitude for the model coefficients exhibiting the smallest difference between the test skin models that produced the first preferred and first undesirable synthetic skin images.

More specifically, in this variation, the device can reduce the range of available values for the first model coefficient—in each test skin model in the second group—proportional to a difference between the first coefficients of the test skin models that produced the first preferred and first undesirable synthetic skin images. The device can repeat this process for each other model coefficient value.

The device can then pseudorandomly populate the second group of test skin models with model coefficients, each selected from within its corresponding narrowed second range of available coefficient values.

6.2.3 Multiple First Preferred Synthetic Skin Images

Additionally or alternatively, the device can prompt or enable the user to select multiple preferred synthetic skin images from the first group of synthetic skin images, such as a "first primary" skin image and a "first secondary" synthetic skin image.

In one implementation, the first primary synthetic skin image may correspond to a first skin model containing a first set of model coefficients, and a first secondary synthetic skin image may correspond to a second skin model containing a second set of model coefficients. The model coefficients in the first skin model that are very similar to corresponding model coefficients in the second skin model may suggest high user sensitivity to these model coefficients. Similarly, model coefficients in the first skin model that are very dissimilar to corresponding model coefficients in the second skin model may suggest low user sensitivity to these model coefficients. Therefore, in this variation, rather than narrow the available range of model coefficient values—for the second group of test skin models—by a fixed magnitude around the model coefficients of the first test skin model associated with the first synthetic face image as described above, the device can instead: narrow the available range of model coefficient values by a greatest magnitude for model coefficients exhibiting the greatest similarity between the test skin models that produced the first primary and secondary synthetic skin images; and narrow the available range of model coefficient values by a smallest magnitude for the model coefficients exhibiting the greatest difference between the test skin models that produced the first primary and secondary synthetic skin images.

More specifically, the device can reduce the range of available values for the first model coefficient—in each test skin model in the second group—inversely proportional to the difference in the first coefficients of the test skin models that produced the first primary and secondary synthetic skin images. The device can repeat this process for each other model coefficient value.

The device can then pseudorandomly populate the second group of test skin models with model coefficients, each selected from within its corresponding narrowed second range of available coefficient values.

6.2.4 Second Preferred Synthetic Skin Image

The device can then implement methods and techniques described above to: pass the stored facial landmark container and each test skin model in the second group of test skin models into the synthetic face generator to generate a second group of (e.g., nine) synthetic skin images in Block S124; render the second group of synthetic skin images in the user interface, such as in a 3×3 grid array, in Block S126; and prompt the user to select a second preferred synthetic skin image from the second group of synthetic skin images.

6.3 Third Refinement Cycle

The device can then repeat this process—with a further-narrowed range of model coefficient values based on model coefficients contained in a second test skin model associated with the second preferred synthetic skin image—to generate a third set of test skin models, to generate and render a third set of synthetic skin images based on these skin models, and to receive selection of a third preferred test skin model from the user.

6.3.1 Third Group of Test Skin Models

In one implementation, the device further limits a range of available values for each model coefficient—in a third group of test skin models—based on the model coefficients in a second test skin model that produced the second preferred synthetic skin image. For example, the device can reduce the available range for each model coefficient value to 25% of its total nominal range, centered around the corresponding model coefficient value of the second test skin model. In this example, a second test skin model—associated with the second preferred synthetic skin image—can include model coefficients [0.7001, 0.0299, 0.0807, 0.4815, 0.8723, . . . ]. Accordingly, the computer system can: limit the range of first model coefficients in the second group of test skin models to between (0.5751, 0.8251); limit the range of second model coefficients in the second group of test skin models to between (0.0000, 0.1549); limit the range of third model coefficients in the second group of test skin models to between (0.0000, 0.2057); limit the range of fourth model coefficients in the second group of test skin models to between (0.3565, 0.6065); and limit the range of fifth model coefficients in the second group of test skin models to between (0.7473, 0.9973); etc.

The device can then implement methods and techniques described above to pseudorandomly populate the third group of test skin models with model coefficients, each selected from within its corresponding narrowed third range of available coefficient values.

6.3.2 Second Undesirable Synthetic Skin Image

In one variation, the device can implement methods and techniques described above to: prompt the user to select a first least-favorite (or "undesirable") synthetic skin image from the first group; and reduce the range of available values for the first model coefficient—in each test skin model in the third group—proportional to the difference in the second coefficients of the test skin models that produced the second preferred and second undesirable synthetic skin images. The device then: repeats this process for each other model coefficient; and then pseudorandomly populates the third group of test skin models with model coefficients, each selected from within its corresponding narrowed third range of available coefficient values.

6.3.3 Coefficient Sensitivity

In the foregoing implementation, the device can narrow the available range of values of a model coefficient for the next group of test skin models based solely on the model coefficients associated with the last preferred synthetic skin image selected by the user.

Alternatively, the device can narrow the available range of values of a model coefficient for the next group of test skin models based on the model coefficients associated with all preferred synthetic skin images henceforth selected by the user during this skin generation cycle. For example, after the user selects the second preferred synthetic skin image, the device can: calculate a first sensitivity for a first model coefficient inversely proportional to a difference between the first model coefficients of first and second test skin models that produced the first and second preferred synthetic skin images; calculate a first range width inversely proportional to this sensitivity (i.e., proportional to the first model coefficients of the first and second test skin models); and define a first range of values for a first model coefficient spanning the first range width and centered at the average of the first model coefficients within the first and second test skin models. The device can repeat this process for the remaining model coefficients to define available model coefficient ranges for a third group of test skin models.

The device can then implement methods and techniques described above to generate and render a third group of synthetic skin images based on these available model coefficient ranges.

Later, after the user selects a third preferred synthetic skin image from this third set of synthetic skin images, the device can similarly: calculate a sensitivity for the first model coefficient inversely proportional to a variance between the first model coefficients of the first, second, and third test skin models that produced the first, second, and third preferred synthetic skin images; calculate a first range width inversely proportional to this sensitivity; and define a first range of values for the first model coefficient that spans the first range width and is centered at the average of the first model coefficients of the first, second, and third test skin models.

Alternatively, after the user selects a third preferred synthetic skin image from this third set of synthetic skin images, the device can: calculate a sensitivity for the first model coefficient inversely proportional to the difference between the first model coefficients of the second and third test skin models only; calculate the first range width inversely proportional to this sensitivity; and define a first range of values for a first model coefficient that spans the first range width and is centered at the average of the first model coefficients of the second and third test skin models only.

The device can repeat this process for the remaining model coefficients to define available model coefficient ranges for a fourth group of test skin models; and then implement methods and techniques described above to generate and render a fourth group of synthetic skin images based on these available model coefficient ranges.

6.3.3 Third Preferred Synthetic Skin Image

The device can then implement methods and techniques described above to: pass the stored facial landmark container and each test skin model in the third group of test skin models into the synthetic face generator to generate a third group of (e.g., nine) synthetic skin images; render the third group of synthetic skin images in the user interface, such as in a 3×3 grid array; and prompt the user to select a third preferred synthetic skin image from the third group of synthetic skin images.

6.4 Subsequent Refinement Cycles

The device can then repeat the foregoing methods and techniques to execute additional refinement cycles, to record synthetic skin image preferences entered by the user, and to narrow available model coefficient ranges based on these user preferences. For example, the device can execute a total of five or nine refinement cycles during one skin model generation process. Alternatively, the device can: execute up to a maximum of five or nine refinement cycles during one skin model generation process; present an option to finalize a skin model based on any single synthetic skin image depicted in the user interface during a refinement cycle; and conclude the model generation cycle and generate a skin model responsive to selection of this option prior to the last refinement cycle in the sequence.

6.5 Refinement Check: Verification Skin Model

In one variation, when generating the second group of model coefficients, the device: narrows the ranges of model coefficient values based on model coefficients contained in the first test skin model associated with the first preferred synthetic skin image; generates a subset of (e.g., eight) test skin models containing model coefficients within these narrowed ranges; generates a verification skin model containing model coefficients outside of these narrowed ranges; generates a second set of (e.g., nine) synthetic skin images based on these test skin models and the verification skin model; and renders all (e.g., all nine) of these synthetic skin images in the user interface during the second refinement cycle.

Then, if the user selects from the eight synthetic skin images that correspond to the subset of test skin models containing model coefficients within the narrowed ranges of model coefficient values, the device can: confirm the trajectory of skin model refinement during the skin model generation process; and continue to the next refinement cycle as described above.

However, if the user selects the synthetic skin image corresponding to the verification skin model, the device can: detect a refinement failure; and recalculate the narrowed ranges of model coefficient values (solely) based on model coefficients contained in the verification skin model. Alternatively, if the user selects the synthetic skin image corresponding to the verification skin model, the device can recalculate the narrowed ranges of model coefficient values (solely) based on a combination of the model coefficients in the verification skin model and the first skin model associated with the first preferred synthetic skin image previously selected by the user. The device can then regenerate the second set of test skin models and synthetic skin images accordingly and repeat this second refinement cycle.

The device can then implement this process during each subsequent refinement cycle during the skin model generation process.

6.6 Refinement Cycle Reset

In one variation, during the first refinement cycle, the device can present an option to regenerate the first set of test skin models and the corresponding first set of synthetic skin images, such as if the user prefers any of the synthetic skin images thus presented. Thus, if the user selects this option, the device can implement the foregoing methods and techniques to regenerate a new set of first test skin models, generate a new first set of synthetic skin images based on these new test skin models, render these new synthetic skin images for the user, and then continue through subsequent refinement cycles as described above.

In this variation, the device can also limit a quantity of test skin model resets available to the user, such as up to three test skin model resets per skin model generation process.

6.7 Controlled Start

In one variation, the device implements methods and techniques described above to calculate a face model based on an image or reference video clip of the user (e.g., the reference image described above). This face model thus contains a set of "authentic" model coefficients that represent the user's unique facial structure, complexion, facial textures, etc. as depicted in the image.

The device can then: define first narrowed ranges of possible model coefficient values—for the first refinement cycle—around these authentic model coefficients; and populate the first set of test skin models with model coefficients contained within these first narrowed ranges of possible model coefficient values.

In another variation, when the user uploads a target image, such as a photographic image of a celebrity or a color image of a cartoon character, the device checks the identity of a face depicted in the target image for a match to the user. For example, the device can: extract facial biometric values from the target image; and compare to facial biometric data linked to the user's account or to another face or look model in the user's account. If these facial biometric values match the user's stored facial biometric data, the device can initialize and generate a look model as described above. Alternatively, if these facial biometric values do not match the user's stored facial biometric data, the device can: initiate a new skin generation cycle; implement methods and techniques described above to derive a set of target model coefficients that represent the user as depicted in the reference image; define a first narrowed set of possible model coefficient values around these target model coefficients; and populate the first set of test skin models with model coefficients contained within this first narrowed set of possible model coefficient values.

Therefore, the device can enable the user to supply a target image of another human or character (e.g., an animated character) and then initiate generation of a skin model accordingly. In particular, the device can: implement facial characteristics extracted from this target image as a starting point within a new skin generation cycle; but also present a sequence of unique synthetic skin image sets that deviate from this target image. Thus, the device can interface with the user to generate a unique skin model that is (loosely) derived from or based on the target image of another human face or character.

6.8 Variable Test Skin Model Generation Via Scrolling

In one variation, during a refinement cycle, the device can implement methods and techniques described above to: define a grid array (e.g., a 3×3 grid array) containing a first quantity of (e.g., nine) tiles in the user interface; generate a first quantity of (e.g., nine) test skin models equal to the first quantity of tiles; generate a first quantity of (e.g., nine) synthetic skin images based on these test skin models; and render these synthetic skin images in these tiles within the user interface. Then, when the user scrolls down over the user interface, the device can: define and render a new row of (e.g., 3) tiles at the bottom of the user interface; generate a next set of (e.g., 3) test skin models—containing pseudo-randomly-generated model coefficients—equal to a quantity of tiles in the new row; generate a next set of synthetic skin images based on these next test skin models; render these next synthetic skin images in this next row of tiles at the bottom of the user interface; and repeat this process as the user scrolls down the user interface during this refinement cycle.

The device can then execute a next refinement cycle responsive to a preferred synthetic skin image selected from these synthetic skin images.

6.9 Live Synthetic Skin Images

In the foregoing implementations, the device can generate synthetic skin images based on a singular facial landmark container extracted from the reference image of the user.

Alternatively, during each refinement cycle, the device can: access a live video feed captured by the camera integrated into (or connected to) the device; detect and track the user's face in this live video feed; extract a live feed of facial landmark containers from this video feed; and inject this live feed of facial landmark containers and current test skin models into the synthetic face generator to generate multiple live synthetic skin image feeds that depict animated synthetic faces exhibiting expressions and poses analogous to those of the user as depicted in the live video feed.

Therefore, the device can render animated synthetic skin images based on a live video feed of the user during a refinement cycle, thereby enabling the user to view herself depicted (or "mirrored") according to multiple test skin models concurrently during a refinement cycle.

6.10 Skin Model Completion

Block S130 of the method S100 recites storing a test skin model associated with a preferred synthetic skin image as a skin model in a user account associated with the user. Generally, once the user selects a preferred synthetic skin image from a set of synthetic skin images presented during a final refinement cycle, the device can: retrieve the corresponding test skin model; store the model coefficients in a new skin model; and store the new skin model in the user's account or otherwise link the new skin model to the user's account in Block S130.

Later, the device can enable the user to select this skin model—from a corpus of face, look, and/or skin models—from the user's account. For example, the device can enable the user to select the skin model to temporarily share with a second user—for remote generation of synthetic face images of the user according to the skin model—during a video call. In another example, the device can enable the user to select the skin model for local generation of synthetic face images of the user—according to the skin model—which the device then transmits to a second user in the form of a live synthetic video feed during a video call. In yet another example, the device can enable the user to select the skin model for local generation of synthetic face images of the user to post to an online social network.

6.11 Live Skin Model Completion

As described above, the device can execute the foregoing skin model generation process during a setup period prior to a video call. Alternatively, the device can execute the foregoing skin model generation process to generate a new skin model for the user during a video call, such as at the start of the video call or in the midst of the video call. More specifically, the device can then enable the user to switch from a preexisting or previously-selected face, look, or skin model or from a live video feed to this new skin model—once generated—during the video call.

7. Body Skin Model

The device can implement similar methods and techniques to generate a body skin model (or "body avatar") that contains a unique combination of model coefficients and is configured to generate a synthetic body image representing a human-like torso—different from the user—when inserted into the synthetic body generator with a body landmark container extracted from an image of the user's body. More specifically, the device can interface with the user to generate and refine a body skin model in a format similar to a body model but that produces synthetic body images that differ—subtly or significantly—from the user's true torso shape.

8. Video Call Configuration

Figure 4:
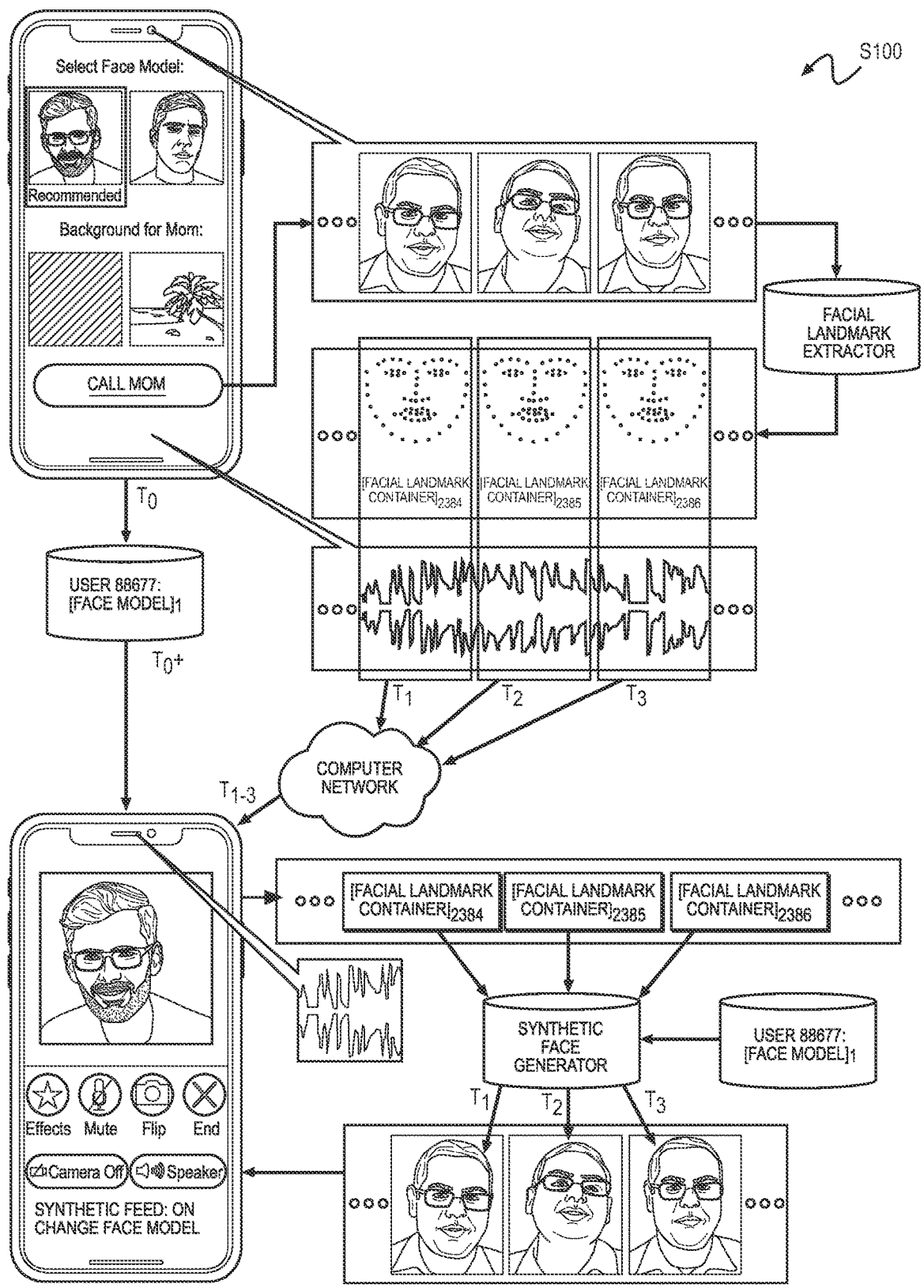
FIG. 4 is a flowchart representation of one variation of the method.

When a first user opens the native or browser-based video conferencing application executing on a first device, the first device can interface with the user to configure an upcoming video call with a second user, including selection of a face model, look model, skin model, body model, and/or background for representing the first user at the second user's device, as shown in FIG. 4.

8.1 Biometric Check

In one implementation, just before or at the start of the video call, the first device: captures a verification image or a verification video clip of the first user; extracts biometric data from the verification image or verification video clip; and confirms that these extracted biometric data match or sufficiently correspond to biometric data associated with the user's account.

8.2 Face/Look/Skin Model Selection

Upon confirming this correspondence, the first device can prompt the user to select from a set of available face, look, and skin models—associated with the user—for the upcoming video call.

For example, after confirming the identify of the first user based on biometric data extracted from the verification image or verification video clip, the first device can access or generate a synthetic face image for each available face, look, and skin model linked to the user's account, such as by injecting a nominal facial landmark container (e.g., representing an average smiling face) and each available face, look, and skin model into the synthetic face generator to generate a set of nominal synthetic face images representing this set of face, look, and skin models. The first device can then render these synthetic face images within the application and prompt the first user to select a synthetic face image from this set.

In this example, the first device can also suggest or recommend a particular face, look, and skin model for the video call. For example, if the first user has elected the second user from a contact list or address book and previously associated face, look, and skin models in her account with different groups of contacts, the first device can recommend a particular face, look, or skin model—from this set of available face, look, and skin models—associated with a contact group including the second user.

The first device can then retrieve a face, look, or skin model thus selected by the user (e.g., from local memory or from a remote database) and transmit a copy of this face, look, or skin model to the second user's device, as shown in FIG. 4. Alternatively, the first device can return this selection to the remote computer system, and the remote computer system can transmit a copy of the corresponding face, look, or skin model to the second user's device. Accordingly, the second device can load and store a temporary copy of this face, look, or skin model associated with the first user for the duration of this video call.

8.3 Failed Biometric Check

Conversely, if the first device fails to verify that biometric data extracted from the verification image or verification video clip match or sufficiently correspond to biometric data associated with the first user's account, the first device (and/or the remote computer system) can: disable transmission of a facial landmark container feed from the first device to the second device; and implement methods and techniques described below to generate a new face, look, or skin model for the first user in (near) real-time based on a video clip captured by the user's device just before or just after the first user enters the video call.

Once the first device (or the remote computer system) generates this new face, look, or skin model for the first user, the first device (or the remote computer system) can: transmit this new face, look, or skin model to the second device; and activate transmission of a facial landmark container feed from the first device to the second device Alternatively, if the first device fails to verify that biometric data extracted from this verification image or verification video clip match or sufficiently correspond to biometric data associated with the user's account, the first device (and/or the remote computer system) can query a corpus of face, look, and skin models stored in a remote database for a subset of face, look, and/or skin models associated with biometric data that match or sufficiently correspond to biometric data extracted from the verification image or verification video clip. Upon identifying this subset of face, look, and/or skin models, the first device can implement methods and techniques similar to those described above to: present these face, look, and/or skin models to the first user, such as by rendering synthetic face images generated according to these face, look, and/or skin models; prompt the first user to select from this subset of face, look, and/or skin models; and then queue transmission of the selected face, look, or skin model to the second device.

8.4 Body Model

In one variation in which the first device (or the remote computer system) previously generated a body model of the first user and linked this body model to the first user's account, the first device can also queue transmission of this body model to the second device, such as after verifying an identity of the first user.

Alternatively, in this variation, if the user's account contains multiple body models and multiple face, look, or skin models, the first device can select a particular body model linked to the face, look, or skin model selected by the user for this video call and queue transmission of this body model to the second device. Yet alternatively, if the user's account contains multiple body models, then the first device can: prompt the user to select from this set of body models, such as by rendering synthetic body images generated according to these available body models; and then queuing transmission of a body model—thus selected by the first user—to the second device, as shown in FIG. 4.

8.5 Background Selection

In one variation, the first device also prompts the first user to elect a background for the video call.

For example, the first device can access a corpus of preexisting static and dynamic (e.g., animated) backgrounds, such as including: solid background colors (e.g., white, gray, yellow); background patterns (e.g., a television test pattern, a brocade pattern, a chevron patter); a stock image (e.g., a stock conference room image, a stock outdoor image, a stock beach image); and/or a stock video clip (e.g., a stock video clip of a beach with waves crashing in a background). In this example, the first device prompts the first user to select from this corpus of preexisting static and dynamic (e.g., animated) backgrounds for the video call.

In this example, the first device can also enable the user to upload a background image, such as a photographic image of the user's office, living room, or favorite space. Additionally or alternatively, the first device can extract a background from a look image previously provided by the user or from the verification image or verification video clip captured before the start of the video call and enable the user to select this background for the duration of the video call.

Upon selection of the background by the first user, the first device can transmit a copy of the background to the second device or otherwise queue the second device to load this background.

8.6 Second Device

Therefore, prior to initiating a video call with the second device, the first device can interface with the first user to select a face, look, or skin model of the first user, a body model of the first user, and/or a background for her synthetic video feed, which together define how the first user is visually presented to the second user during the video call. Prior to entering or at the start of the video call, the second device can access or download local copies of the selected face, look, or skin model of the first user (hereinafter the "first face model"), the selected body model of the first user (hereinafter the "first body model"), and/or the background selected by the first user (hereinafter the "first background"). More specifically, prior to the video call, the first device (or the remote computer system) can automatically grant the second device permission to securely download the first face model, etc. selected by the first user.

Concurrently and prior to entering the video call, the second device can interface with the second user to select a face, look, or skin model of the second user, a body model of the second user, and/or a background for her synthetic video feed during the video call, which together define how the second user is visually presented to the first user during the video call. Prior to entering or at the start of the video call, the first device can access or download local copies of the selected face, look, or skin model of the second user (hereinafter the "second face model"), the selected body model of the second user (hereinafter the "second body model"), and/or the background selected by the second user (hereinafter the "second background"). More specifically, prior to the video call, the second device (or the remote computer system) can automatically grant the first device permission to securely download the first face model, etc. selected by the second user.

9. Video Call

Then, during the video call, the first device can: capture a first video feed; implement a local copy of the facial landmark extractor to represent constellations of facial landmarks—detected in the first video feed—in a first feed of facial landmark containers; and transmit the first feed of facial landmark containers to the second device. Upon receipt, the second device can: transform the first feed of facial landmark containers and a local copy of the first face model of the first user into a first feed of synthetic face images according to the synthetic face generator; and render the first feed of synthetic face images over the first background.

Concurrently, the second device can: capture a second video feed; implement a local copy of the facial landmark extractor to represent constellations of facial landmarks—detected in the second video feed—in a second feed of facial landmark containers; and transmit the second feed of facial landmark containers to the first device. Upon receipt, the first device can: transform the second feed of facial landmark containers and a local copy of the second face model of the second user into a second feed of synthetic face images according to the synthetic face generator; and render the second feed of synthetic face images over the second background.

9.1 Facial Landmark Container Feeds

In particular, in preparation for the video call, the first device can: load local copies of the synthetic face generator, the facial landmark extractor, the second face model of the second user, and the second background selected by the second user. During the video call, the first device can: capture a first audio feed; compress the first audio feed into a first feed of audio packets; capture a first video feed; compress the first video feed into a first facial landmark container feed; and stream the first feed of audio packets and the first facial landmark container feed to the second device in near real-time (e.g., with a maximum time of 50 milliseconds from capture to upload).

For example, for a first video frame in the first video feed, the first device can implement the facial landmark extractor to: detect the first user's face in a first region of the first video frame; detect positions of facial landmarks in the first region of the first video frame; and generate a first facial landmark container that represents positions of these facial landmarks in the first region of the first video frame. The first device can then upload the first facial landmark container with a first audio packet—captured around (e.g., within 50 milliseconds of) a capture time of the first video frame—to a computer network, which distributes the first facial landmark container and the first audio packet to the second device.

Then, for a second (e.g., next) video frame in the first video feed, the first device can: implement face tracking or object tracking techniques to track the first user's face from the first region in the first frame to a second region in the second video frame; and implement the facial landmark extractor to generate a second facial landmark container that represents positions of facial landmarks in the second region of the second video frame. The first device can then upload the second facial landmark container with a second audio packet—captured around a capture time of the second video frame—to the computer network, which distributes the second facial landmark container and the second audio packet to the second device.

Concurrently, the second device can implement similar methods and techniques to stream a second feed of audio packets and a second facial landmark container feed to the first device.

9.2 Synthetic Face Image Feeds

During the video call, the second device renders the first background in a video call portal within a second instance of the application executing on the second device.

Upon receipt of a facial landmark container and a corresponding audio packet from the first device, the second device can: extract audio data from the audio packet; insert the facial landmark container and the first face model of the first user into a local copy of the synthetic face generator—stored in local memory on the second device—to generate a synthetic face image; and render the synthetic face image over the first background within the video call portal (e.g., to form a "first synthetic video feed") while playing back the audio data via an integrated or connected audio driver.

By repeating this process for each audio packet and facial landmark container received from the first device during the video call, the second device can thus generate and render a first synthetic video feed depicting the first user's face over the first background—synchronized to playback of an audio stream from the first device—in near real-time (e.g., with less than one second of latency).

The first device can implement similar methods and techniques during the video call to generate and render a second synthetic video feed depicting the second user's face over the second background—synchronized to playback of an audio stream from the second device—in near real-time.

9.3 Variation: Synthetic Body Image Feeds

In one variation, the first device similarly: detects the first user's body in the first video feed; transforms the first video feed into a first feed of body landmark containers; and streams this first feed of body landmark containers to the second device. In this variation, the second device can then implement similar methods and techniques: to inject the first body model and each subsequent body landmark container received from the first device into a local copy of the synthetic body generator—stored in local memory on the second device—to generate a first stream of synthetic body images of the first user; and to then render this first stream of synthetic body images—with the first stream of synthetic face images of the first user—over the first background while playing back the first audio stream received from the first device.

In this variation, the second device can thus generate and render a first synthetic video feed—representing an authentic depiction of the first user's face, body, facial expressions, and body posture—over the first background in near real-time during the video call.

Similarly, in this variation, the first device can generate and render a second synthetic video feed—representing an authentic depiction of the second user's face, body, facial expressions, and body posture—over the second background in near real-time during the video call.

9.4 Internal Synthetic Face Image Feed

In one variation, the first device can implement similar methods and techniques to locally generate a first synthetic video feed of the first user and to render this first synthetic video feed within the video call portal within the first instance of the application executing on the first device, thereby enabling the first user to visualize how she is seen by the second user during the video call.

For example, during the video call, the first device can render the first background—adjacent the second background—in the video call portal within the first instance of the application executing on the second device. Upon extraction of a facial landmark container from a next frame in the first video feed, the first device can: insert the facial landmark container and the first face model of the first user into a local copy of the synthetic face generator—stored in local memory on the first device—to generate a synthetic face image; and render the synthetic face image over the first background within the video call portal while concurrently rendering a second synthetic face image of the second user over the second background.

9.5 Video Call Conclusion

Then, upon conclusion of the video call, the first device can delete local copies of the second face model, the second body model, and/or the second background; and the second device can similarly delete local copies of the first face model, the first body model, and/or the first background.

10. Other Synthetic Face Image Modalities

As described above, the first device, the second device, and/or the remote computer system can execute Blocks of the method S100 during a video call: to verify the identity of the first user and to generate facial landmark containers at the first device; and to generate and render synthetic face images of the first user according to a face (or look) model selected by the first user and these facial landmark containers at the second device.

Alternatively, the first device, the second device, and/or the remote computer system can execute Blocks of the method S100 during a video call: to generate facial landmark containers at the first device; and to verify the identity of the first user, to generate synthetic face images of the first user according to a face (or look) model selected by the first user and these facial landmark containers, and to render these synthetic face images at the second device.

Yet alternatively, the first device, the second device, and/or the remote computer system can execute Blocks of the method S100 during a video call: to generate facial landmark containers at the first device; to verify the identity of the first user at the remote computer system; and to generate and render synthetic face images of the first user according to a face (or look) model selected by the first user and these facial landmark containers at the second device.

Alternatively, the first device can execute Blocks of the method S100 (e.g., during a video call or private user session): to generate facial landmark containers; to verify the identity of the first user; and to generate synthetic face images of the first user according to a face (or look) model selected by the first user and these facial landmark containers at the second device. The first device can then: stream these synthetic face images to a second device during a video call; or render these synthetic face images as a synthetic video feed, such as for the first user to capture and post to a social networking platform; and/or render individual synthetic face images, such as for the first user to select and post to a social networking platform.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for generating a synthetic skin model includes:
    accessing an image of a user;
    detecting a face of the user in a region of the image;
    generating a facial landmark container comprising facial landmarks extracted from the region of the image;
    initializing a first set of test skin models, each test skin model in the first set of test skin models populated with a set of model coefficients:
        selected from a first set of possible model coefficient values; and
        defining parameters for constructing a synthetic face unique within the first set of test skin models;
    injecting the first set of test skin models and the facial landmark container into a synthetic face generator to generate a first set of synthetic skin images, each synthetic skin image in the first set of synthetic skin images representing a synthetic face, unique within the first set of synthetic skin images, according to facial landmarks extracted from the region of the image;
    rendering the first set of synthetic skin images within a user interface;
    receiving selection of a first preferred synthetic skin image from the first set of synthetic skin images;
    narrowing the first set of possible model coefficient values around model coefficients contained in a first test skin model associated with the first preferred synthetic skin image to define a second set of possible model coefficient values;
initializing a second set of test skin models, each test skin model in the second set of test skin models populated with a set of model coefficients:
- selected from the narrowed set of possible model coefficient values; and
- defining parameters for constructing a synthetic face unique within the second set of test skin models;

injecting the second set of test skin models and the facial landmark container into the synthetic face generator to generate a second set of synthetic skin images;
rendering the second set of synthetic skin images within a user interface;
receiving selection of a second preferred synthetic skin image from the first set of synthetic skin images; and
storing a second test skin model associated with the second preferred synthetic skin image as a skin model in a user account associated with the user.

\* \* \* \* \*